United States Patent
Adams

(10) Patent No.: US 6,483,032 B2
(45) Date of Patent: Nov. 19, 2002

(54) ELECTRICAL CONNECTION COVER

(76) Inventor: Greg Adams, 26181 Lodgepole Ct., Hemet, CA (US) 92544

(*) Notice: Subject to any disclaimer, the term of this patent is extended or adjusted under 35 U.S.C. 154(b) by 0 days.

(21) Appl. No.: 09/849,676

(22) Filed: May 4, 2001

(65) Prior Publication Data

US 2001/0037891 A1 Nov. 8, 2001

Related U.S. Application Data

(60) Provisional application No. 60/202,047, filed on May 5, 2000.

(51) Int. Cl.$^7$ ................................................. H05K 5/03
(52) U.S. Cl. ........................ 174/66; 174/67; 220/241; 220/242
(58) Field of Search .......................... 174/66, 67, 50; 220/241, 242, 4.02; D8/353; D13/177; 439/538; 248/906

(56) References Cited

U.S. PATENT DOCUMENTS

| 4,082,915 A | | 4/1978 | Silver | |
|---|---|---|---|---|
| 4,780,573 A | * | 10/1988 | Own | 174/66 |
| 5,180,886 A | * | 1/1993 | Dierenbach et al. | 174/66 |
| 5,725,390 A | | 3/1998 | Watts | |
| 5,955,702 A | * | 9/1999 | Grossman et al. | 174/66 |
| 5,981,875 A | * | 11/1999 | Kesler et al. | 220/241 X |
| 6,278,062 B1 | * | 8/2001 | Sowdon | 174/66 |
| 6,281,440 B1 | * | 8/2001 | Baldwin et al. | 174/66 |

* cited by examiner

Primary Examiner—Dean A. Reichard
Assistant Examiner—Dhiru R Patel
(74) Attorney, Agent, or Firm—Matthew J. Peirce

(57) ABSTRACT

A new and improved apparatus is disclosed for enclosing Romex wire (standard electrical wire) in an inline connection. The apparatus is composed of two attached box-like portions which are pivotally mounted to one another. On each end of each box-like portion, a tab is present which can be removed in order to allow for a Romex wire to flow through the box when the box would be snapped shut. The box is designed to enclose the wire nuts of any electrical connection in order to improve fire safety requirements for standard electrical wire. One of the box-like portions has an externally mounted tab which would allow the present invention to be mounted on a standard "2 by 4" beam.

2 Claims, 2 Drawing Sheets

ELECTRICAL CONNECTION COVER

This application claims the benefit of No. 60/202,047, filed May 5, 2000.

BACKGROUND OF THE INVENTION

The present invention concerns that of a new and improved apparatus for enclosing Romex wire (standard electrical wire) in an inline connection.

DESCRIPTION OF THE PRIOR ART

U.S. Pat. No. 5,725,390, issued to Watts, discloses an electrical connector for interconnecting a pair of three-wire parallel conductor cables of the ROMEX variety.

U.S. Pat. No. 4,082,915, issued to Silver, discloses an electrical connection box which comprises a hollow, molded or cast housing having plural walls, at least one of which includes an opening configured to receive an electrical conductor therethrough.

SUMMARY OF THE INVENTION

The present invention concerns that of a new and improved apparatus for enclosing Romex wire (standard electrical wire) in an inline connection. The apparatus is composed of two attached box-like portions which are pivotally mounted to one another. On each end of each box-like portion, a tab is present which can be removed in order to allow for a Romex wire to flow through the box when the box would be snapped shut. The box is designed to enclose the wire nuts of any electrical connection in order to improve fire safety requirements for standard electrical wire. One of the box-like portions has an externally mounted tab which would allow the present invention to be mounted on a standard "2 by 4" beam.

There has thus been outlined, rather broadly, the more important features of an electrical connection cover in order that the detailed description thereof that follows may be better understood and in order that the present contribution to the art may be better appreciated. There are, of course, additional features of the electrical connection cover that will be described hereinafter and which will form the subject matter of the claims appended hereto.

In this respect, before explaining at least one embodiment of the an electrical connection cover in detail, it is to be understood that the electrical connection cover is not limited in its application to the details of construction and to the arrangements of the components set forth in the following description or illustrated in the drawings. The electrical connection cover is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present locator apparatus system. It is important, therefore, that the claims be regard as including such equivalent constructions insofar as they do not depart from the spirit and scope of the present invention.

It is therefore an object of the present invention to provide an electrical connection cover which has all of the advantages of the prior art and none of the disadvantages.

It is another object of the present invention to provide an electrical connection cover which may be easily and efficiently manufactured and marketed.

It is another object of the present invention to provide an electrical connection cover which is of durable and reliable construction.

It is yet another object of the present invention to provide an electrical connection cover which is economically affordable and available to the buying public.

It is yet another object of the present invention to provide an electrical connection cover which provides additional benefits not present in the prior art.

Other objects, features and advantages of the present invention will become more readily apparent from the following detailed description of the preferred embodiment when considered with the attached drawings and appended claims.

DESCRIPTION OF THE PREFERRED EMBODIMENT

Figure 1:
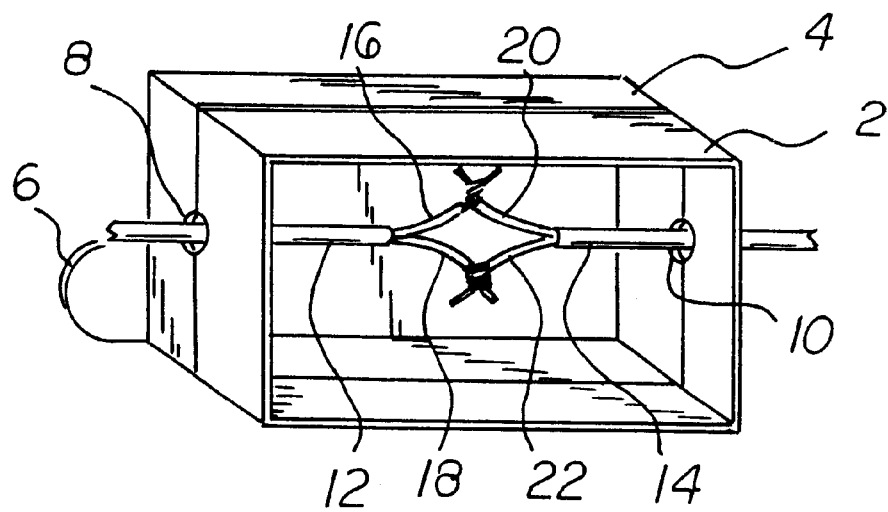
FIG. 1 shows a perspective view of the present invention, with the front section of the present invention attached to the rear section.

FIG. 1 shows a perspective view of the present invention, with front section 2 of the present invention attached to rear section 4. The front face of front section 2 has been removed so that the full purpose of the present invention can be shown in the diagrams herein. The present invention would in effect serve as an electrical connection cover for two adjoining wires and would further insulate the electrical connection from surrounding materials.

When the front section 2 and the rear section 4 of the present invention are touching, the present invention has a front surface, a rear surface, a left surface, a right surface, a top surface, and a bottom surface. In addition, an internal cavity is formed within front section 2 and rear section 4.

The rear surface of the present invention, located on rear section 4, has one or more tabs 6 which would allow the present invention to be properly mounted on a "2 by 4" beam. In addition, the center of the left surface has first hole 8, while the center of the right surface has second hole 10. First hole 8 and second hole 10 are present in order to allow a Romex wire, or standard electrical wire, to pass through the present invention. For both first hole 8 and second hole 10, half of each hole is carved out of front section 2, while the other half of each hole is carved out of rear section 4.

As can be seen in FIG. 1, first wire 12 and second wire 14 are connected to one another within the present invention. The positive wire 16 of first wire 12 has been connected to the positive wire 20 of second wire 14, while the negative wire 18 of first wire 12 has been connected to the negative wire 22 of second wire 14. The present invention has been designed to protect the "connection points" or "wire nuts" seen in FIG. 1, in an effort to further isolate and protect spots that would be deemed to be electrically hot. As the two connection points of first wire 12 and second wire 14 would be either electrically hot or have the potential to be electrically hot if jostled or bumped, the present invention would isolate these two connection points from potential flammable materials, such as insulation, padding, or other such flammable material.

Figure 2:
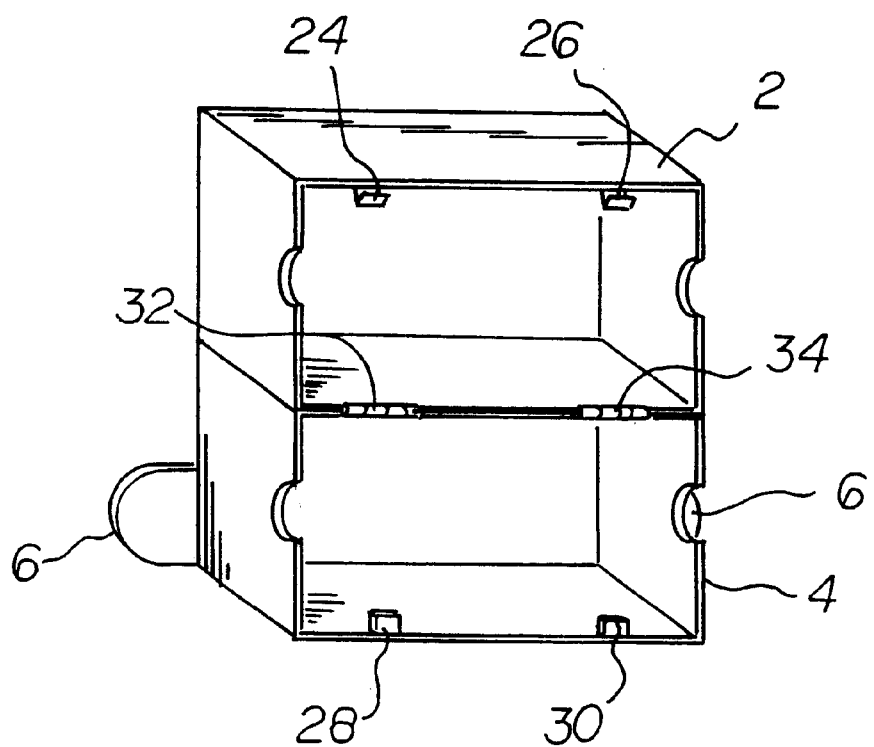
FIG. 2 shows a perspective view of the present invention, with the front section completely opened and resting on top of the rear section of the present invention.

FIG. 2 shows a perspective view of the present invention, with the front section 2 completely opened and resting on top of the rear section 4 of the present invention. As can be seen, front section 2 is connected to rear section 4 by hinges 32 and 34, which allow for pivoting and allow a user to easily access the contents within the present invention at any time. FIG. 2 also allows hinge locks 24, 26, 28, and 30 to be seen, as they are located inside of front section 2 and rear section 4. Once front section 2 and rear section 4 have been placed together, hinge locks 24, 26, 28, and 30 will allow a user to removably connect front section 2 to rear section 4 until a user would pull apart front section 2 from rear section 4 once again. Hinge lock 24 would capable of removably connecting to hinge lock 28, while hinge lock 26 would be capable of removably connecting to hinge lock 30.

Figure 3:
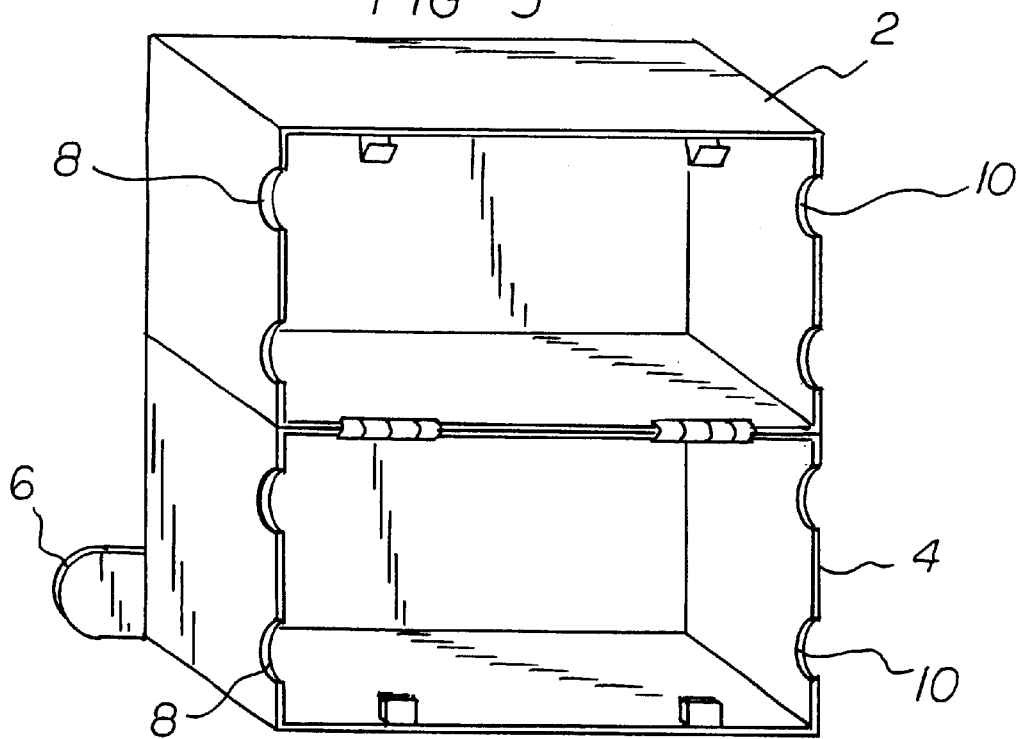
FIG. 3 shows a perspective view of a first alternative embodiment of the present invention, with the front section completely opened and resting on top of the rear section of the present invention.

FIG. 3 shows a perspective view of a first alternative embodiment of the present invention, with the front section 2 completely opened and resting on top of the rear section 4 of the present invention. This embodiment, as seen in FIG. 3, would have approximate dimensions of three inches by three inches by four inches. The only difference between FIG. 3 and the preferred embodiment of the present invention is that FIG. 3, would have four holes instead of two, which would allow passage of up to two electrical wires instead of just one wire.

Figure 4:
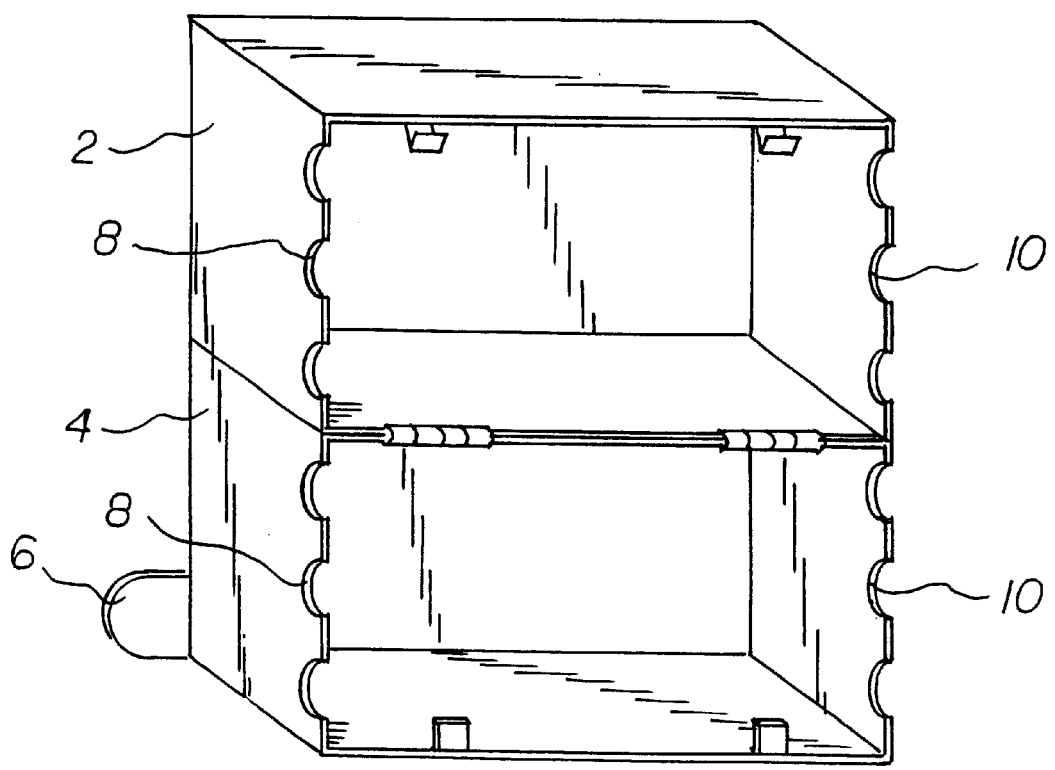
FIG. 4 shows a perspective view of a second alternative embodiment of the present invention, with the front section completely opened and resting on top of the rear section of the present invention.

FIG. 4 shows a perspective view of a second alternative embodiment of the present invention, with the front section completely opened and resting on top of the rear section of the present invention. This embodiment, as seen in FIG. 4, would have approximate dimensions of four inches by four inches by five inches. The only difference between FIG. 4 and the preferred embodiment of the present invention is that FIG. 4, would have six holes instead of two, which would allow passage of up to three electrical wires instead of just one wire.

I claim:

1. An electrical connection cover comprising:
    (a) a front section with an approximately rectangular shape, the front section including a front face, the front face having two sides, an inner side and an outer side, the front section also including two side surfaces, a left side surface and a right side surface, the left side surface and the right side surface each including a rear edge, the left side surface and the right side surface each including two sides, an inner side and an outer side, the front section further including a top surface, the top surface including a rear edge, the top surface including two sides, an inner side and an outer side, the front section further including a bottom surface, the bottom surface including a rear edge, the bottom surface including two sides, an inner side and an outer side, the left side surface having a semicircular indentation on the rear edge of the left side surface, the right side surface including a semicircular indentation on the rear edge of the right side surface,
    (b) a rear section with an approximately rectangular shape, the rear section including a rear face, the rear face having two sides, an inner side and an outer side, the rear section also including two side surfaces, a left side surface and a right side surface, the left side surface and the right side surface each including a front edge, the left side surface and the right side surface each including two sides, an inner side and an outer side, the rear section further including a top surface, the top surface including a front edge, the top surface including two sides, an inner side and an outer side, the rear section further including a bottom surface, the bottom surface including a front edge, the bottom surface including two sides, an inner side and an outer side, the left side surface having a semicircular indentation on the front edge of the left side surface, the right side surface including a semicircular indentation on the front edge of the right side surface, the front edge of the top surface of the rear section being pivotally connected to the rear edge of the top surface of the front section,
    (c) at least one tab, each tab being attached to the outer side of the rear face of the rear section,
    (d) means for removably attaching the front section to the rear section, the means further comprising (i) a first hinge lock attached to the inner side of the bottom surface of the front section near the rear edge of the bottom surface of the front section, (ii) a second hinge lock attached to the inner side of the bottom surface of the front section near the rear edge of the bottom surface of the front section, (iii) a third hinge lock attached to the inner side of the bottom surface of the rear surface near the front edge of the bottom surface of the rear section, (iv) a fourth hinge lock attached to the inner side of the bottom surface of the rear section near the front edge of the bottom surface of the rear section, (v) wherein the first hinge lock and third hinge lock removably connect when placed in contact with one another, and further wherein the second hinge lock and the fourth hinge lock removably connect when placed in contact with one another, and
    (e) wherein the semicircular indentation on the rear edge of the left side surface of the front section matches up with the semicircular indentation on the front edge of the left side surface of the rear section to create a first hole of sufficient size to allow standard electrical wire to pass through the first hole, and further wherein the semicircular indentation on the front edge of the right side surface of the front section matches up with the semicircular indentation on the front edge of the right side surface of the rear section to create a second hole of sufficient size to allow standard electrical wire to pass through the second hole.

2. An electrical connection cover comprising:
    (a) a front section with an approximately rectangular shape, the front section including a front face, the front face having two sides, an inner side and an outer side, the front section also including two side surfaces, a left side surface and a right side surface, the left side surface and the right side surface each including a rear edge, the left side surface and the right side surface each including two sides, an inner side and an outer side, the front section further including a top surface, the top surface including a rear edge, the top surface including two sides, an inner side and an outer side, the front section further including a bottom surface, the bottom surface including a rear edge, the bottom surface including two sides, an inner side and an outer side, the left side surface having at least two semicircular indentations on the rear edge of the left side surface, the right side surface including at least two semicircular indentations on the rear edge of the right side surface, (b) a rear section with an approximately rectangular shape, the rear section including a rear face, the rear face having two sides, an inner side and an outer side, the rear section also including two side surfaces, a left side surface and a right side surface, the left side surface and the right side surface each including a front edge, the left side surface and the right side surface each including two sides, an inner side and an outer side, the rear section further including a top surface, the top surface including a front edge, the top surface including two sides, an inner side and an outer side, the rear section further including a bottom surface, the bottom surface including a front edge, the bottom surface including two sides, an inner side and an outer side, the left side surface including at least two semicircular indentations on the front edge of the left side surface, the right side surface including at least two semicircular indentations on the front edge of the right side surface, the front edge of the top surface of the rear section being pivotally connected to the rear edge of the top surface of the front section, (c) at least one tab, each tab being attached to the outer side of the rear face of the rear section, (d) means for removably attaching the front section to the rear section, the means further comprising (i) a first hinge lock attached to the inner side of the bottom surface of the front section near the rear edge of the bottom surface of the front section, (ii) a second hinge lock attached to the inner side of the bottom surface of the front section near the rear edge of the bottom surface of the front section, (iii) a third hinge lock attached to the inner side of the bottom surface of the rear surface near the front edge of the bottom surface of the rear section, (iv) a fourth hinge lock attached to the inner side of the bottom surface of the rear section near the front edge of the bottom surface of the rear section, (v) wherein the first hinge lock and third hinge lock removably connect when placed in contact with one another, and further wherein the second hinge lock and the fourth hinge lock removably connect when placed in contact with one another, and (e) wherein the semicircular indentations on the rear edge of the left side surface of the front section match up with the semicircular indentations on the front edge of the left side surface of the rear section to create a first plurality of holes of sufficient size to allow standard electrical wire to pass through a hole of the first plurality of holes, and further wherein the semicircular indentations on the front edge of the right side surface of the front section matches up with the semicircular indentations on the front edge of the right side surface of the rear section to create a second plurality of holes of sufficient size to allow standard electrical wire to pass through a hole of the second plurality of holes.

* * * * *